July 25, 1967 G. L. PRICE 3,332,694

SELF-ACTUATING TORQUE GRIPPING DEVICE

Filed June 26, 1964

INVENTOR
GORDON L. PRICE

BY *Cushman, Darby & Cushman*
ATTORNEYS

United States Patent Office …

3,332,694
Patented July 25, 1967

3,332,694
SELF-ACTUATING TORQUE GRIPPING DEVICE
Gordon L. Price, Fairfax, Ala., assignor to West Point-Pepperell, Inc., a corporation of Georgia
Filed June 26, 1964, Ser. No. 378,406
6 Claims. (Cl. 279—66)

This invention relates to a drive apparatus and, more particularly, to a self-actuating, torque gripping device for driving a rotatable member.

In the machine tool field it is necessary to grip a workpiece within a chuck to permit rotation of the piece for the work operation and thereafter to release the piece therefrom. This requires that the chuck jaws be brought to bear against the workpiece to secure and center the workpiece within the chuck. On completion of the work operation, the chuck jaws must be disengaged from gripping contact with the workpiece to permit release thereof.

In other environments, as for example in the textile field, apparatus is employed for winding up the work product on a take-up device rotatably driven by a suitable spindle drive. To permit selective rotation of the take-up reel and to facilitate rapid removal thereof from the drive arrangement, a suitable clutch device is provided to couple the drive spindle to the rotatably driven take-up.

Prior chuck arrangements have generally required a set-up operation to couple the workpiece to the drive as well as a release operation to remove the workpiece therefrom. Conventional clutch arrangements have usually required mechanisms incorporated therein for selectively coupling and de-coupling the rotatable member and its drive. In the past, attempts have been made to utilize the rotary motion of the drive to perform these functions, but the systems developed have suffered the disadvantages of being complex and costly.

It is a principal object of the invention to provide a self-actuating torque gripping device for driving a rotatable member, which device automatically engages and centers the rotatable member on actuation of the drive member and which releases the rotatable member when the drive is stopped.

Ancillary to the immediately preceding object, it is a further object of the invention to provide a self-actuating torque gripping device which requires no tools or additional selectively operated coupling mechanisms to engage or to release the rotatably driven member.

An additional object of the invention is to provide a self-actuating torque gripping device for driving a rotatable member which is inexpensive to construct and is trouble-free in operation.

Further objects and the entire scope of the invention will become more fully apparent when considered in light of the following detailed description of an illustrative embodiment of this invention and from the appended claims.

The illustrative embodiment may be best understood by reference to the accompanying drawings, wherein.

Figure 1:
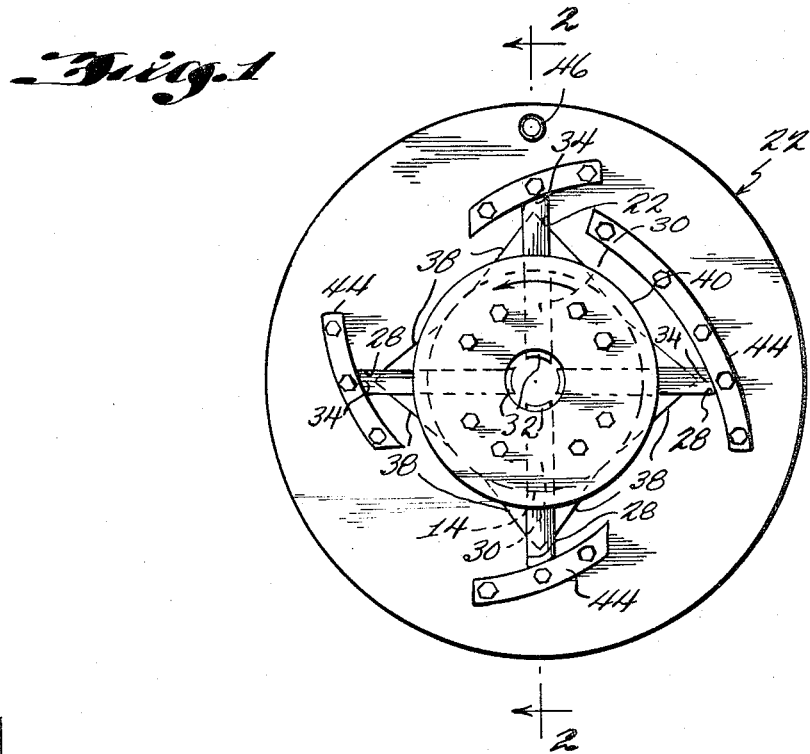
FIGURE 1 is an end elevational view of the invention.

Briefly, the invention comprises a pair of relatively rotatable elements, the first of said elements being connected for rotation to a drive spindle, or shaft, and the second being joined to a rotatably driven load member which may be a workpiece, take-up device or the like. Mounted for rotation with the first rotatable element, but radially movable with respect thereto, are gripping means comprising a plurality of radially spaced, spring-loaded chuck jaws, the longitudinal axes of which coincide at a single point along the axis of rotation of the drive spindle. A plurality of cam elements, corresponding in number to the chuck jaws, are attached to the second rotatable element at radially spaced intervals to be engaged by the outer ends of the spring-loaded chuck jaws thereby interconnecting the pair of relatively rotatable elements. In operation, a portion of the rotatably driven load member is loosely positioned within the jaws. On actuation of the drive spindle, a momentary relative rotation is produced between the pair of rotatable elements, occasioned by the resistance of the load member to rotation, to move the cam elements with respect to the ends of the chuck jaws to displace the latter inwardly, against the urging of their springs, into firm engagement with the driven load member to thereby grip and center the driven member. As the relative rotation ceases due to the increased positive contact between the chuck jaws and the cam elements, the torque developed by the drive spindle is translated to both rotatable elements and consequently, to the load member. When the machine is stopped, the action of the springs forces the chuck jaws outwardly thereby automatically producing reverse relative rotation of the rotatable elements to release the driven load member.

The details of the construction will now be set forth with reference to FIGURES 1 and 2 of the drawings. In this illustrative embodiment, it will be assumed that the rotatable load member to be driven is a loom beam utilized in a textile operation in which a number of strands of yarn are wound on the beam. This beam is partially illustrated in broken lines in FIGURE 2. A drive means, such as spindle 10, having a hollowed interior 12, is provided to drive the beam. A first rotatable element, indicated generally at 14, is keyed to spindle 10 at 16 to rotate therewith. Element 14 is substantially disk-shaped having an annular shoulder 18 on the inner side thereof, shoulder 18 defining a flange portion 20 at the outer portion of element 14. A second rotatable element 22 is mounted concentric to element 14 and is relatively rotatable with respect thereto. Element 22 is provided with a recess 24 in the outer surface thereof to receive the flange portion 20 of element 14. Recess 24 defines an interior flange portion 26 which is received within the annular shoulder 18 of element 14. The inner surfaces of elements 14 and 22 are positioned in the same plane. However, element 14 is of greater width than element 22 and projects ahead of the front end of spindle 10. A plurality of identical radially spaced recesses 28 are provided in the outer surface of element 14, the longitudinal axes of these recesses coinciding at a single point on the axis of rotation of the spindle 10. A chuck jaw 30 is positioned within each of the recesses 28. Although four jaws are utilized in the illustrative embodiment, it will be appreciated that any suitable number may be employed. The inner ends 32 of the chuck jaws grip a portion of the load member and the outer ends 34 serve as cam followers. The bottom surfaces of recesses 28 lie in a plane spaced forwardly of that defined by the front surface of spindle 10. Accordingly, an area 36 is provided between the front surface of rotatable element 22 and the rear surfaces of chuck jaws 30. Suitable wire spring means 38 are positioned within area 36. Springs 38 are attached to the periphery of rotatable element 14 and to the ends 34 of chuck jaws 30 to urge said jaws outwardly. A pair of plates 40 and 42 are positioned on opposite sides of rotatable elements 14 and 22. These plates are interconnected by suitable means (indicated as conventional bolts) to hold elements 14 and 22, and the associated chuck jaws 30, together as a rotatable assembly. A plurality of radially spaced cam elements 44 are attached to the outer surface of element 22 adjacent the ends 34 of chuck jaws 30. Ends 34 of each of the jaws are continuously urged against their associated cam elements 44 by springs 38. Cam elements 44 are dimensioned to provide, from one end thereof to the other, an increasing distance to the center of rotation of the drive spindle 10. A driving element, such as pin 46, is connected to rotatable element 22 at the edge thereof. Pin 46 translates rotation of element 22 to the beam through the beam head as shown. The beam is provided with a beam journal which at one end (not shown) is inserted in a conventional tailstock. The other end extends through an aperture 48 provided in plate 40, the area between the ends 32 of chuck jaws 30 to a position within the hollowed interior 12 of drive spindle 10.

Now that the structure of the illustrative embodiment has been set forth in detail, its operation will be described. With the system at rest, the chuck jaws 30 loosely hold the beam journal. This will become more obvious as the operation is developed. On actuation of drive spindle 10 in a counterclockwise direction, rotatable element 14 moves therewith. Due to the initial inertia of the beam to be overcome, as well as additional resistance of the beam to rotation resulting from yarn tension thereon, limited relative rotation between element 14 and rotatable element 22, which is connected by pin 46 to the beam, is generated. Accordingly, ends 34 of the chuck jaws 30 follow cam elements 44 towards their rise portions (the portions of the cam elements which are increasingly closer to the axis of rotation of the drive spindle) thereby depressing the chuck jaws 30 against the action of springs 38 to cause increasing engagement of ends 32 of the chuck jaws against the beam journal to center and to firmly grip the journal. As relative rotation of elements 14 and 22 terminates due to the increased positive contact between the chuck jaws and the cam elements, the journal is rotated under the influence of the torque developed on the spindle and the rotatable elements 14 and 22. When the drive spindle is stopped, the springs 38 urge the chuck jaws outwardly to automatically generate relative rotation of elements 14 and 22 in the reverse sense to that previously described. Consequently, ends 34 of the chuck jaws move towards the dwell portions of their respective cams to release ends 32 from the beam journal.

Figure 2:
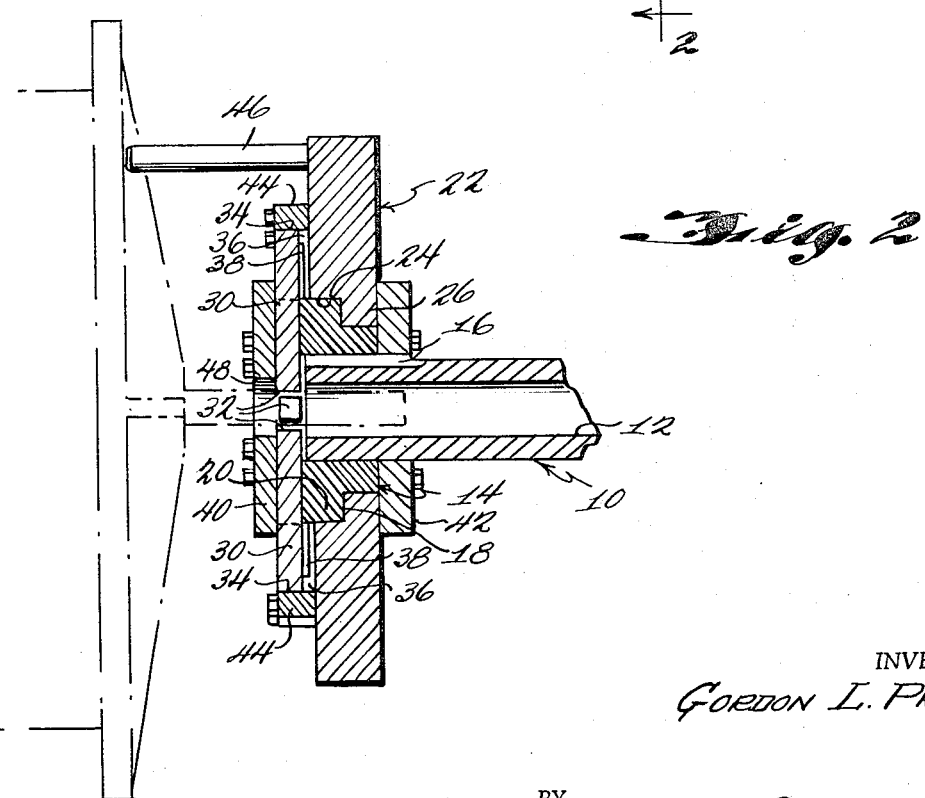
FIGURE 2 is a view in cross-section taken along line 2—2 of FIGURE 1, the drive being employed in conjunction with a loom beam shown, for purposes of illustration, in broken lines.

It should be noted in FIGURE 1 that one of the cam elements 44 has an extended rise portion which projects to a point substantially along a radial line to the end of the dwell portion of an adjacent cam element, this extended portion lying intermediate the end of the dwell portion and the axis of rotation of the drive spindle. By this arrangement, the possibility that the chuck jaws 30 could pass the ends of the dwell portions of cam elements 44 and be projected outwardly beyond the cams by the springs 38 to thereby prevent further closing of the chuck jaws is eliminated since the projecting rise portion of the extended cam element 44 serves as a stop to engage one of the jaws 30 to limit relative rotation of elements 14 and 22 in the reverse sense.

Instead of utilizing an extended rise portion of one cam element 44 to prevent the dis-engagement of jaws 30 with their respective cam elements on release of the chuck jaws, one of the cam elements may be provided with an inwardly directed shoulder at the end of its dwell portion to engage its associated chuck jaw to limit the relative rotation of elements 14 and 22. Another alternative arrangement for performing this function is to provide a pin, or stud, at an appropriate position on the outer surface of element 22 to engage a chuck jaw 30 to limit relative rotation in a reverse sense of elements 14 and 22.

From the foregoing it can be seen that a self-actuating, torque gripping device for driving a rotatable member has been disclosed. This device automatically centers and holds a rotatably driven member and on termination of the driving operation, releases the same to facilitate removal of the driven member. No additional tools or selectively operated coupling mechanisms are required to engage or release the driven member. It can be seen that the invention is equally adaptable for use as a chuck in a machine tool operation, or as a clutch in any number of applications.

The above-described embodiment is illustrative of a preferred embodiment of the invention but is not intended to limit the possibilities of insuring a self-adjusting gripping mechanism for driving a rotatable member, which mechanism automatically grips and centers the driven member for the driving operation and which releases the member on termination of this operation. The design disclosed herein is an example of a device in which the inventive features of this disclosure may be utilized, and it will become apparent to one skilled in the art that certain modifications may be made within the spirit of the invention as defined by the appended claims.

What is claimed is:

1. A self-actuating torque gripping device for driving a rotatable load member comprising: rotatable drive means, a first rotatable element connected to said drive means, a second rotatable element having a drive element thereon for engaging the rotatable load member, said second rotatable element being mounted for relative rotation with respect to said first element; a plurality of radially spaced chuck jaws carried by said first rotatable element for rotation therewith, a plurality of cam elements mounted on said second rotatable element, a cam element associated in contacting relationship with each of said chuck jaws, said drive means and said drive element extending in opposite directions from said rotatable elements, said cam elements being responsive to relative rotation of said first and second rotatable elements for moving their associated chuck jaws in a load member engaging direction.

2. A self-actuating torque gripping device as set forth in claim 1 further comprising means automatically operative on termination of rotation of said drive means for producing relative rotation between said first and second rotatable elements in a reverse sense to that which moved the chuck jaws in a load member engaging direction.

3. A self-actuating torque gripping device for driving a rotatable load member comprising: rotatable drive means, a first rotatable element connected to said drive means, a second rotatable element having a drive element thereon for engaging the rotatable load member, said second rotatable element being mounted for relative rotation which respect to said first element; a plurality of radially spaced chuck jaws carried by said first rotatable element for rotation therewith, said chuck jaws having their longitudinal axes coinciding at a point along the axis of rotation of said drive means, a plurality of cam elements mounted on said second rotatable element, each cam element being associated in contacting relationship with one of said chuck jaws, said drive means and said drive element extending in opposite directions from said rotatable elements, the cam elements being responsive to relative rotation of said first and second rotatable elements for moving their associated chuck jaws in a load member engaging direction.

4. A self-actuating torque gripping device as set forth in claim 3 further comprising means automatically operative on termination of rotation of said drive means for producing relative rotation between said first and second rotatable elements in a reverse sense to that which moved the chuck jaws in a load member engaging direction.

5. A self-actuating torque gripping device as set forth in claim 4 wherein said means for automatically producing relative rotation in a reverse sense includes spring means engaging said first rotatable element and said chuck jaws to continuously urge the chuck jaws longitudinally away from said point.

6. A self-actuating torque gripping device as set forth in claim 4 further comprising means for limiting the relative rotation of said first and second rotatable elements in the reverse sense to maintain the cam elements in contacting relationship with their associated chuck jaws.

References Cited
UNITED STATES PATENTS

| | | | |
|---|---|---|---|
| 540,649 | 6/1895 | Eastwood | 242—72 |
| 792,791 | 6/1905 | Rich | 279—71 |
| 1,352,376 | 9/1920 | Oppenheimer | 279—114 |
| 1,506,035 | 8/1924 | Valtman | 279—33 |
| 2,578,245 | 12/1951 | Heaton | 279—33 |

ROBERT C. RIORDON, *Primary Examiner.*

E. A. CARPENTER, H. V. STAHLHUTH,
*Assistant Examiners.*